United States Patent [19]

Teh

[11] Patent Number: 5,523,100
[45] Date of Patent: Jun. 4, 1996

[54] PRODUCTION OF A SEASONING

[75] Inventor: Shiok G. Teh, Singapore, Singapore

[73] Assignee: Nestec S.A., Vevey, Switzerland

[21] Appl. No.: 273,340

[22] Filed: Jul. 11, 1994

[30] Foreign Application Priority Data

Aug. 21, 1993 [EP] European Pat. Off. .............. 93113388

[51] Int. Cl.$^6$ .......................... A23L 1/221; A23L 1/105; A23L 1/28

[52] U.S. Cl. .................................. 426/46; 426/49; 426/7; 426/60

[58] Field of Search .................................. 426/46, 49, 7, 426/60

[56] References Cited

U.S. PATENT DOCUMENTS

| | | |
|---|---|---|
| 3,878,302 | 4/1975 | Luksas et al. ............................ 426/46 |
| 4,008,333 | 2/1977 | Izuni ........................................ 426/46 |
| 4,113,892 | 9/1978 | Shimizu et al. . |
| 4,587,127 | 5/1986 | Akao et al. . |
| 4,642,236 | 2/1987 | Friend et al. ............................ 426/44 |
| 4,684,527 | 8/1987 | Motai et al. . |
| 4,882,180 | 11/1989 | Takao et al. . |
| 5,100,679 | 3/1992 | Delrue . |
| 5,141,756 | 8/1992 | Bajracharya et al. . |
| 5,141,757 | 8/1992 | Ho Dac et al. . |
| 5,352,464 | 10/1994 | Kotegawa .................................. 426/18 |

Primary Examiner—Donald E. Czaja
Assistant Examiner—Choon P. Koh
Attorney, Agent, or Firm—Vogt & O'Donnell

[57] ABSTRACT

A seasoning agent is prepared by adding water to a koji and hydrolyzing at a temperature of from 2° C. to 25° C. at a pH of from 4.5 to 10 for a time of from 6 hours to 28 days. Salt is added to the hydrolyzed koji to form a moromi, which is fermented.

20 Claims, No Drawings

PRODUCTION OF A SEASONING

BACKGROUND OF THE INVENTION

The present invention relates to a process for the production of a seasoning, more particularly to the production of seasoning by the biological hydrolysis of protein containing material.

Hydrolysed proteins have been known for use as seasonings in food systems for centuries in the Far East in the form of soya sauce, which traditionally has been prepared by enzymatic hydrolysis requiring a long period of time, usually several months, for preparation. In producing soya sauce, plant protein-containing materials, such as cooked soya beans or defatted flour, and carbohydrates are inoculated with Aspergilli and the solid culture is fermented for 2 days to make koji, during which time enzymes are produced which are able to hydrolyse protein and carbohydrates in the moromi stage. The koji is mixed with a solution of common salt to give moromi, which is fermented for 4 to 8 months by the activity of micro-organisms such as soya lactic acid bacteria and soya yeast, and the soya sauce is obtained by removing the solids portion from the fermented moromi.

About 100 years ago, a more rapid method of hydrolysing proteins for producing seasonings was developed using hydrochloric acid in which the time required is only a few hours. However, in recent years, the use of acid hydrolysed plant protein (HPP) in culinary applications has been under criticism due to the presence of some chloro-compounds which arises from the acid process. Therefore, attempts have been made to develop HPP replacements which can be used as body-givers in culinary applications. Soya sauce is one such suitable replacement. However, owing to the differences in the raw materials and the processing methods involved, the two produces, HPP and soya sauce, have some differences in terms of chemical composition and flavour profile. Dosage of soya sauce which can be used as an HPP replacement is limited due to its "fermented" note. The different processing procedures also result in a significant variation in the degree of hydrolysis of the protein containing material to the amino acids. Soya sauce has a lower amino acid content than HPP and this leads to a significantly weaker body in soya sauce than in HPP.

SUMMARY OF THE INVENTION

The present invention provides a process for the production of a seasoning based on modified standard soya sauce technology in which the koji is treated, before forming the moromi, by a low temperature hydrolysis whereby the resultant seasoning has a stronger body than a standard soya sauce.

In particular, the present invention provides a process of treating a koji, which comprises hydrolysing koji at a temperature of from 2° to 25° C. and a pH of from 4.5 to 10 for a period of from 6 hours to 28 days.

DETAILED DESCRIPTION OF THE INVENTION

The koji employed in the present invention is prepared by the conventional soya sauce process which comprises, for example, inoculating a protein-containing material and a carbohydrate with a culture of *Aspergillus oryzae* and/or *Aspergillus sojae* on a culture bed to form the koji. The protein containing material is advantageously a plant protein material, for instance, soya beans, corn gluten or rice gluten but is preferably wheat gluten. The plant protein-containing material is advantageously cooked and is preferably used in solid particulate form for enabling the mould of *Aspergillus oryzae* and/or *Aspergillus sojae* to grow on the surface or the particles and eventually penetrate into the particles. The koji is conveniently fermented in the solid state.

The hydrolysis of the koji is preferably carried out in the substantial or complete absence of salt and advantageously with constant agitation.

The koji is conveniently hydrolysed by mixing with from 1 to 5 parts of water per part by weight of koji, most advantageously in the absence of salt. The hydrolysis is carried out preferably at a temperature from 2° to 20° C., for a period of from 12 hours to 25 days, more preferably from 3° to 15° C. for a period of from 18 hours to 22 days and especially from 4° to 10° C. for a period of from 24 hours to 20 days.

After hydrolysis of the koji, salt and yeast are conveniently added to the hydrolysed koji to form a moromi. The moromi is preferably fermented for a period of from 1 to 6 weeks, more preferably from 2 to 4 weeks. The moromi fermentation may be carried out under aerobic or anaerobic conditions.

After the fermentation, the matured moromi may be pressed to separate a liquid sauce from a solid residue. The liquid sauce is advantageously pasteurised, e.g., at a temperature of from 80° to 120° C. and then filtered to give a liquid seasoning. If desired, the liquid sauce may be made into a powder for instance, by concentration, then vacuum dried to a low moisture content and finally milled into a powder to give a solid seasoning.

The process according to the present invention results in a higher level or degree of release of amino acids than is generally possible with conventional soya sauce processes.

The seasoning either in liquid or powder form has a higher amino acid content then soya sauce prepared by conventional methods. Because of the higher amino acid content, the seasoning of the present invention has more body than soya sauce prepared by conventional methods. The seasoning prepared according to the present invention has excellent organoleptical stability.

EXAMPLES

The present invention is illustrated by the following Examples, in which parts and percentages are given by weight.

Example 1

Wheat gluten was extruded through a CLEXTRAL extruder into pieces having an average diameter of 5mm and had a porous structure.

65 kg of the extrudates were soaked in 65 kg water at 75° C. for 5 minutes. The soaked extrudates were then heated to 100° C. and held at the same temperature for 10 minutes and afterwards cooled to below 40° C. by applying vacuum. The pasteurisation step was carried out to eliminate secondary contamination after the extrusion step. Finally the cooked extrudates were mixed with a mixture of 28 kg of roasted wheat and 20 g of TKJ (*Aspergillus oryzae* seed inoculum) to give a wheat gluten koji which was fermented for 42 hours by a procedure similar to that used in a conventional soya sauce process. The wheat gluten koji contained no added salt.

During the 42 hours of fermentation, the following temperature profiles were maintained for the culture bed:

| 0–25 hours | 30° C. |
|---|---|
| 25–42 hours | 27° C. |

Similar to a conventional soya sauce process, the koji was mixed at 18th and 25th hours to ensure sufficient airflow through the culture bed for good ventilation.

55 kg of the wheat gluten koji was mixed with 150 kg of water at 10° C. which had previously been sterilised by boiling and then cooled. The mixture was hydrolysed for 24 hours in a jacketed enclosed vessel with chilled water circulating through the jacket to maintain the desired temperature. The mixture was agitated continuously during the hydrolysis.

After the hydrolysis, 27 kg of salt and 11 kg of yeast inoculum were added to 200 kg of the hydrolysed wheat gluten koji to give a moromi which was fermented aerobically by bubbling compressed air through the batch for 4 weeks.

Finally, the fermented moromi was pressed to separate a wheat gluten sauce from a solid residue. The wheat gluten sauce was treated at 90° C. for 20 minutes. The liquid sauce was concentrated by evaporation. The concentrate obtained was dried in a vacuum oven and then milled into a powder.

For organoleptic evaluation, 10g of liquid sauce or 3.5 g powder were diluted with 250 ml of boiling water. In both cases the seasoning was found to have more body and a more rounded flavour than a conventional soya sauce.

The powder was found to be shelf stable at 30° C. for more than 12 months in moisture tight packaging (alu-laminated sachets) and had excellent colour stability. The seasoning was found to be microbiologically stable.

Example 2

A similar procedure to that described in Example 1 was followed except that the hydrolysis of the wheat gluten koji was carried out over a period of 7 days instead of 24 hours.

The seasoning was found to have more body and a more rounded flavour profile than a conventional soya sauce. The seasoning was microbiologically stable, as in Example 1 and had excellent colour stability in powder form.

Example 3

A similar procedure to that described in Example 1 was followed except that the hydrolysis of the wheat gluten koji was carried out at 4° C. for 14–20 days. The seasoning was found to have more body and a more rounded flavour profile than a conventional soya sauce. The seasoning was microbiologically stable, as in Example 1 and had excellent colour stability in powder form.

I claim:

1. A process for preparing a seasoning agent comprising mixing a koji with water and hydrolyzing at a temperature of from 2° C. to 25° C. at a pH of from 4.5 to 10 for a time of from 6 hours to 28 days to obtain a hydrolyzed koji, adding salt to the hydrolyzed koji to form a moromi and fermenting the moromi.

2. A process according to claim 1 wherein the koji is hydrolyzed at a temperature of from 2° C. to 20° C. for a time of from 12 hours to 25 days.

3. A process according to claim 1 wherein the koji is hydrolyzed at a temperature of from 3° C. to 15° C. for a time of from 18 hours to 22 days.

4. A process according to claim 1 wherein the koji is hydrolyzed at a temperature of from 4° C. to 10° C. for a time of from 24 hours to 20 days.

5. A process according to claim 1 wherein the koji is hydrolyzed in the absence of added salt.

6. A process according to claim 1 wherein the koji is hydrolyzed in the substantial absence of added salt.

7. A process according to claim 1 wherein the koji to be hydrolyzed is mixed with water in a ratio of one part by weight koji to one to five parts by weight water.

8. A process according to claim 1 wherein the koji is mixed with sterile water.

9. A process according to claim 1 wherein the koji is agitated while being hydrolyzed.

10. A process according to claim 1 wherein the moromi is fermented under aerobic conditions.

11. A process according to claim 1 wherein the moromi is fermented under anaerobic conditions.

12. A process according to claim 1 further comprising separating solid residue from the fermented moromi to obtain a liquid sauce.

13. A process according to claim 12 further comprising pasteurizing the liquid sauce.

14. A process according to claim 13 further comprising concentrating the pasteurized sauce.

15. A process according to claim 14 wherein the pasteurized sauce is vacuum-dried.

16. A process according to claim 15 further comprising milling the vacuum-dried sauce into a powder.

17. A process according to claim 1 wherein the moromi is fermented for a time of from 1 week to 6 weeks.

18. A process according to claim 1 wherein the moromi is fermented for a time of from 2 weeks to 4 weeks.

19. A process according to claim 1 further comprising preparing the koji to be hydrolyzed from a cooked plant protein material.

20. A process according to claim 19 wherein the koji is prepared by extruding wheat gluten into porous pieces, cooking the extruded pieces, mixing the cooked pieces with carbohydrates and a culture of Aspergillus and fermenting to obtain a koji.

* * * * *